United States Patent
Jennings, III

(10) Patent No.: US 7,478,160 B2
(45) Date of Patent: Jan. 13, 2009

(54) METHOD AND APPARATUS FOR TRANSPARENT NEGOTIATIONS

(75) Inventor: Raymond B. Jennings, III, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 914 days.

(21) Appl. No.: 10/835,673

(22) Filed: Apr. 30, 2004

(65) Prior Publication Data

US 2006/0031518 A1     Feb. 9, 2006

(51) Int. Cl.
*G06F 15/16* (2006.01)

(52) U.S. Cl. .................. 709/227; 709/203; 709/223; 709/228

(58) Field of Classification Search ............... 709/227, 709/228, 217, 219, 203, 223
See application file for complete search history.

(56) References Cited

U.S. PATENT DOCUMENTS

| | | | |
|---|---|---|---|
| 6,332,163 B1 * | 12/2001 | Bowman-Amuah | 709/231 |
| 6,704,117 B1 * | 3/2004 | Chintakrindi et al. | 358/1.15 |
| 6,931,438 B2 * | 8/2005 | Hartmann et al. | 709/219 |
| 7,293,094 B2 * | 11/2007 | Vaman et al. | 709/227 |
| 2004/0143665 A1 * | 7/2004 | Mace et al. | 709/227 |

* cited by examiner

*Primary Examiner*—Frantz B Jean

(57) ABSTRACT

In one embodiment, the present invention is a method and apparatus for transparent TCP negotiations. In one embodiment, endpoint machines (e.g., clients and servers) negotiate network characteristics through use of TCP header fields, which provide backward capability. Negotiations may be requested or initiated by either endpoint, and if the receiving endpoint is not capable of negotiating, the existing TCP connection will continue to operate as normal.

8 Claims, 4 Drawing Sheets

METHOD AND APPARATUS FOR TRANSPARENT NEGOTIATIONS

BACKGROUND

The present invention relates generally to computing networks, and relates more particularly to computing networks using a transmission or transport layer protocol, e.g., Transmission Control Protocol (TCP). In one embodiment, the invention is a method and apparatus for transparent TCP negotiations.

There is a growing demand to decrease latency and increase bandwidth over computer networks, particularly as increasing numbers of servers are deployed in the networks. One method of achieving these goals is to allow a server to redirect a client request to another server in the network. For networks that use the TCP/IP protocol, such as the internet, redirection can be done at the application layer as it is commonly done in web servers, or it may be achieved through other means, such as network load balancers or dynamic domain name systems (DDNS). However, these means are not without their own drawbacks.

For example, while load balancers can redirect client requests to a back end server within a set of servers, such methods typically require a dedicated load balancing mechanism, which can become a bottleneck for the network. In the case of DDNS, an added burden is placed on a standard DNS server to return one IP address from a given set of IP addresses, wherein the returned address may be selected on a basis that is random, round robin, or based on some other external event (e.g., DNS updates from an external source). The distribution of addresses returned to clients is difficult to optimize, which may result in particular servers being over- or under-loaded. In addition, it is impossible for the DDNS server to be aware of what the current states are for the various servers without some external feedback mechanism.

Thus, there is a need in the art for a method and apparatus for transparent negotiations for a transmission or transport layer protocol, e.g., TCP.

SUMMARY OF THE INVENTION

In one embodiment, the present invention is a method and apparatus for transparent transmission or transport layer protocol negotiations, e.g., TCP negotiations. In one embodiment, endpoint machines (e.g., clients and servers) negotiate network characteristics through use of TCP header fields, which provide backward capability. Negotiations may be requested or initiated by either endpoint, and if the receiving endpoint is not capable of negotiating, the existing TCP connection will continue to operate as normal.

BRIEF DESCRIPTION OF THE DRAWINGS

So that the manner in which the above recited embodiments of the invention are attained and can be understood in detail, a more particular description of the invention, briefly summarized above, may be obtained by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

In one embodiment, the present invention provides a method and apparatus for transparent network characteristic negotiations between two endpoints on a network connection, e.g., a TCP connection. Negotiations may be initiated by either endpoint on the connection, and may pertain to a network characteristic such as computer or network administration and management (e.g., TCP window size, server redirection and the like).

Figure 1:
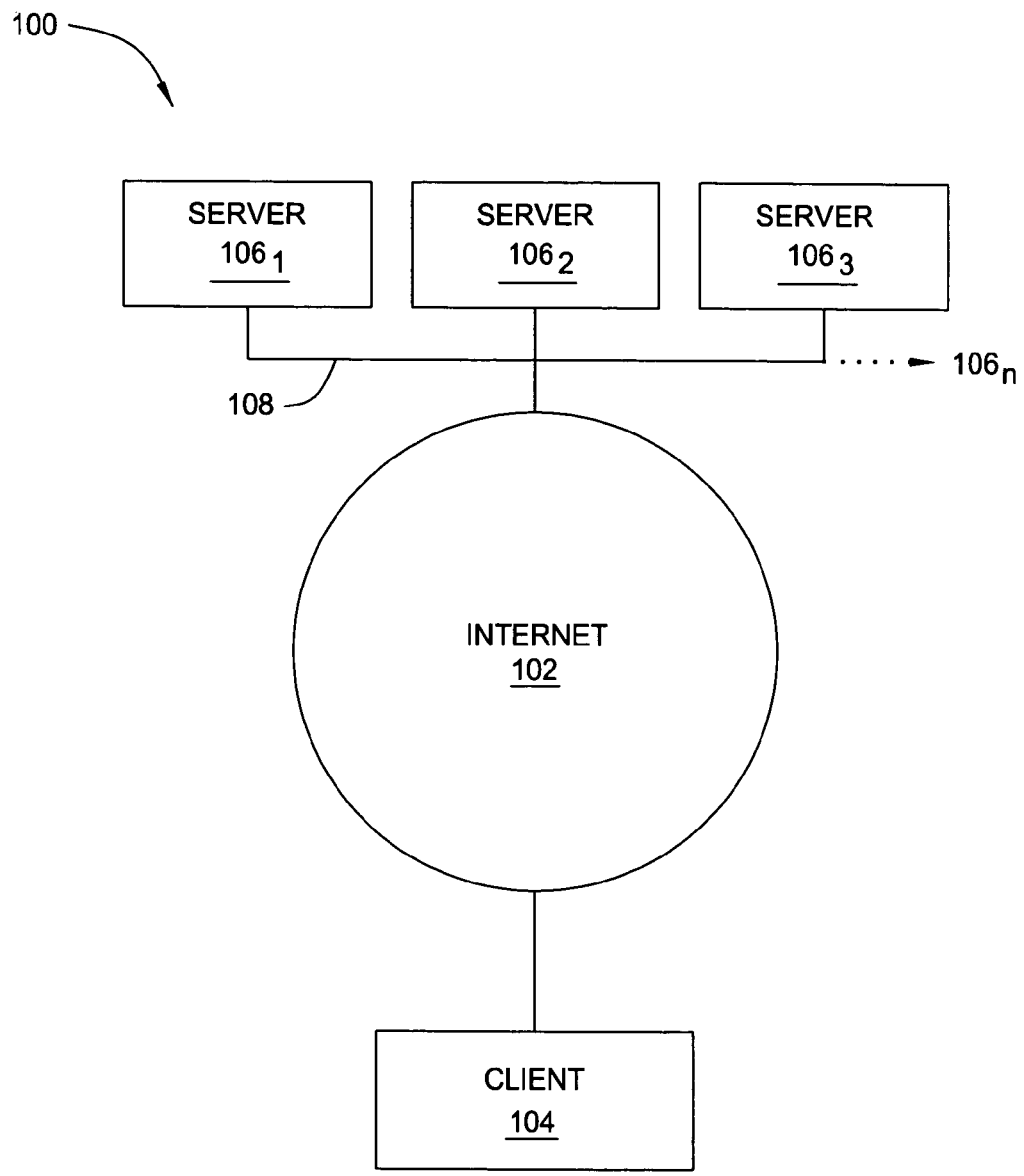
FIG. 1 is a schematic diagram illustrating a network in which one embodiment of the present invention may be implemented.

FIG. 1 is a schematic diagram illustrating one embodiment of a network 100 in which the present invention may be implemented. The network 100 comprises an internet 102 interfaced to at least one client 104 and a plurality of servers 106$_{1-n}$ (hereinafter collectively referred to as "servers 106") on a local area network (LAN) 108. Alternatively, the network 100 may be implemented as an intranet, and the servers 106 do not need to be on the same LAN. Thus, FIG. 1 is intended as an example, and not as an architectural limitation for the present invention.

The client 104 and the servers 106 function as endpoints of the network 100. That is, via a transport layer connection, e.g., a TCP connection, the client 104 may request data from a server 106 on the network 100. The data request is transported through the network 100 to the appropriate server 106, which typically responds by sending the requested data back to the client 104.

According to the present invention, either the client 104 or the server 106 to which the client 104 is connected may initiate a negotiation of one or more network characteristics. Network characteristics that may be negotiated include, without limitation, computer or network administration and management characteristics such as window size (e.g., TCP window size), server redirection, and server shutdown or offline scheduling.

Figure 2:
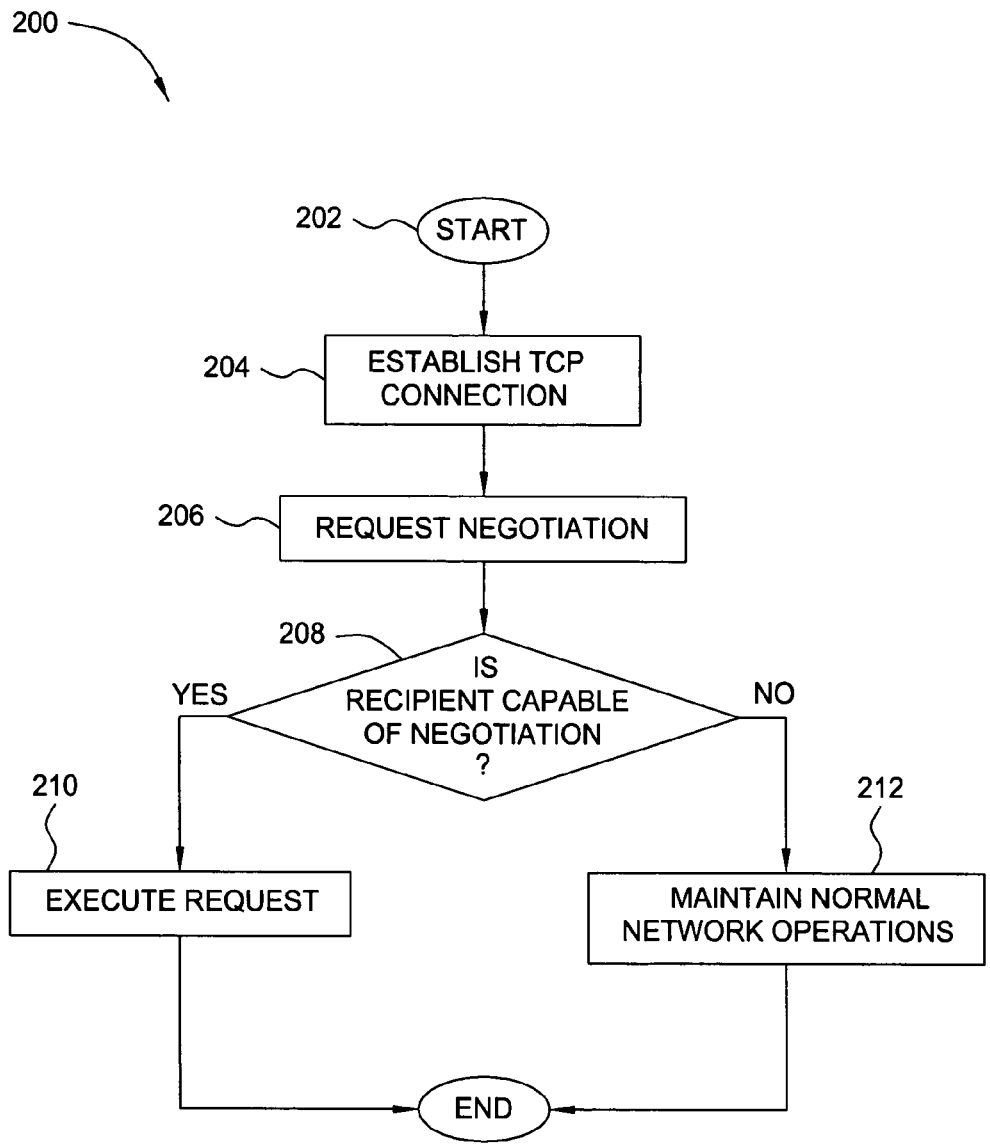
FIG. 2 is a flow diagram illustrating one embodiment of a method for negotiating network characteristics according to the present invention.

FIG. 2 is a flow diagram illustrating one embodiment of a method 200 for negotiating network characteristics. The method 200 is initiated at step 202, and at step 204 the method 200 establishes a network connection, e.g., a TCP connection, between a client and a server. During or after the establishment of the TCP connection, the method 200 proceeds to step 206, where the method 200 requests negotiation of one or more network characteristics. Step 206 may occur at either the client or the server (i.e., either network endpoint may initiate the negotiation). In one embodiment, described in further detail below in conjunction with FIG. 3, method 200 requests negotiation by modifying one or more fields of a TCP header in a data packet sent by the initiating endpoint.

At step 208, the method 200 inquires if the recipient endpoint is capable of negotiation, or aware of the request initiated in step 206. If the recipient endpoint is aware of the request, the method 200 executes the request at step 210. If the recipient endpoint is not aware of the request, the method 200 maintains normal network operations at step 212. The negotiation request thus becomes "transparent" in the sense that normal TCP operations are not affected by the failure to execute the requested negotiation.

The method 200 thus enables endpoints of a network, such a network 100 of FIG. 1, to negotiate network characteristics in order to optimize network operations. The transparent nature of the method 200 allows the method 200 to be implemented in networks in which all TCP capable devices are not necessarily capable of changing their modes of operation, without adversely affecting network operations.

Figure 3:
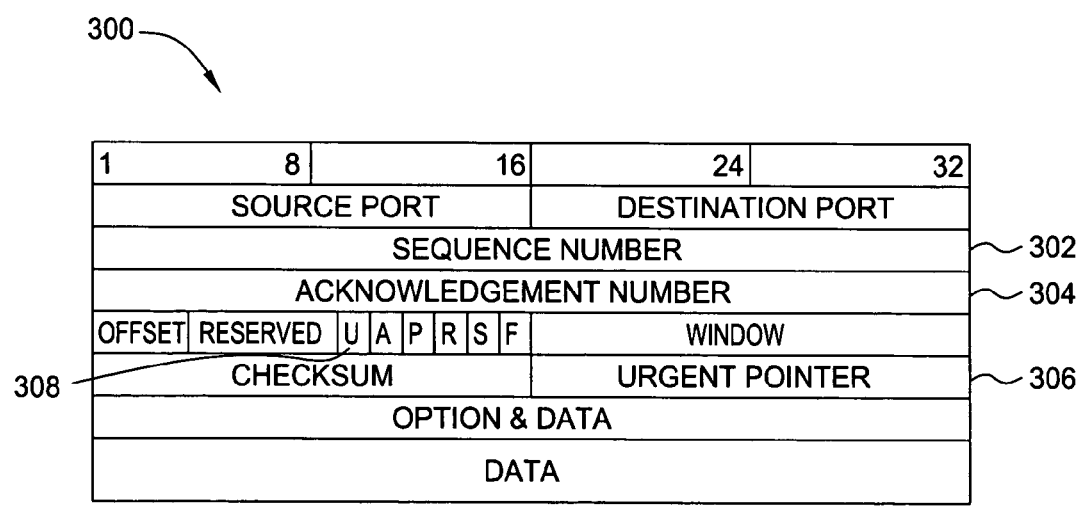
FIG. 3 is a block diagram illustrating one embodiment of a TCP header that may be adapted for use with the method illustrated in FIG. 2.

FIG. 3 is a block diagram illustrating one embodiment of a standard TCP header 300 that may be adapted for use with the method 200 described above. TCP header 300 includes a plurality of fields that contain information about a data packet such as source and destination port numbers. For the purposes of one embodiment of the present invention, fields of significance include the sequence number 302, the acknowledgement number 304, the urgent pointer 306 and urgent bit 308. Specifically, in one embodiment, information pertaining to a negotiation is contained within the sequence number and urgent pointer fields 302, 306.

For example, in one embodiment of the invention, a server redirects a client to an alternate server on the network by encoding the alternate server's IP address within the sequence number field 302, and by setting a portion of the urgent pointer field 306 to a bit pattern that indicates that the sequence number field 302 and urgent pointer field 306 both contain the alternate server's IP address. Thus, the urgent pointer field 306 contains both part of the alternate server's IP address and a bit pattern that indicates the request for redirection. If the client is aware of the server's request for redirection, the client will recognize the bit pattern within the urgent field 306 and connect to the alternate server whose IP address is indicated in the sequence number field 302 and urgent pointer fields 306.

For example, the following sequence illustrates one embodiment of a request to negotiate a server redirection, initiated by the server, in which the client is aware of the request. SEQ indicates the sequence number (e.g., sequence number 302 in FIG. 3), ACK indicates the acknowledgement number (e.g., acknowledgement number 304), URG indicates the urgent pointer (e.g., urgent pointer 306) and CTL indicates control bits (e.g., bits U, A, P, R, S and F in FIG. 3). In the following sequence, the urgent bit (e.g., bit 308) is not set during the illustrated negotiation. Those skilled in the art will recognize that because the urgent bit 308 is not set, the urgent pointer 306 has no meaning under standard TCP functionality; therefore, the urgent pointer 306 may be implemented for the purposes of negotiation:

| CLIENT TCP STATE | TCP FIELDS SET | SERVER TCP STATE |
|---|---|---|
| a) CLOSED | | LISTEN |
| b) SYN-SENT → | SEQ(X), CTL(SYN) → | SYN-RECV |
| | *Normal SYN packet sent by client* | |
| c) SYN-RECV ← | SEQ(Y),ACK(X+1),URG(Z),CTL(SYN,ACK) ← | SYN-SENT |
| | *Server encodes redirection address using SEQ and URG fields* | |
| d) ACK-SENT → | SEQ(X+1),ACK(Y+1),URG(Z'),CTL(ACK) → | ACK-RECV |
| | *Client acknowledges redirection with urgent field* | |
| e) CLOSED | | LISTEN |

In the illustrative sequence shown above, an initial TCP state of a first endpoint, e.g., a client, is closed, and an initial TCP state of a second endpoint, e.g., a server is listening for a transmission (e.g., at step (a)). The client sends a normal SYN packet to the server, e.g., over a normal TCP connection, in step (b). The server responds in step (c) by sending a TCP packet in which a redirection to another server is encoded (e.g., with the address to the other server encoded in the sequence number and urgent pointer fields). The client acknowledges receipt of the redirection request in step (d), e.g., by encoding the acknowledgement in a packet sent back to the server. Thus, an ending TCP state of the client, in step (e), is closed, and an ending TCP state of the server is listening, e.g., for transmissions from other sources.

If the client is not aware of the server's request for redirection, the client will simply operate as normal over the connection to the original server. For example, the following sequence illustrates one embodiment of a request to negotiate a server redirection, initiated by the server, in which the client is not aware of the request. In the following sequence, the urgent bit (e.g., bit 308) is not set during the illustrated negotiation:

| TCP STATE | TCP FIELDS SET | TCP STATE |
|---|---|---|
| a) CLOSED | | LISTEN |
| b) SYN-SENT → | SEQ(X), CTL(SYN) → | SYN-RECV |
| | *Normal SYN packet sent by client* | |
| c) SYN-RECV ← | SEQ(Y),ACK(X+1),URG(Z),CTL(SYN,ACK) ← | SYN-SENT |
| | *Server encodes redirection address using SEQ and URG fields* | |
| d) ACK-SENT → | SEQ(X+1),ACK(Y+1),CTL(ACK) → | ACK-RECV |
| | *Normal TCP connection maintained* | |
| e) ESTABLISHED | | ESTABLISHED |

In the illustrative sequence shown above, an initial TCP state of a first endpoint, e.g., a client, is closed, and an initial TCP state of a second endpoint, e.g., a server is listening for a transmission (e.g., at step (a)). The client sends a normal SYN packet to the server, e.g., over a normal TCP connection, in step (b). The server responds in step (c) by sending a TCP packet in which a redirection to another server is encoded (e.g., with the address to the other server encoded in the sequence number and urgent pointer fields). The client is not aware of the server's redirection request; therefore, a normal TCP connection between the client and server is maintained in step (d). Thus, ending TCP states of both the client and the server reflect the established TCP connection in step (e).

In another embodiment, the client, and not the server, requests redirection to an alternate server by setting the urgent pointer field 306 within a TCP header of a first packet sent from the client to the original server. If the server is aware of the redirection request, the server will set the urgent pointer field and return an alternate server's IP address within the sequence number and urgent pointer fields. The following sequence illustrates one embodiment of a request to negotiate a server redirection, initiated by the client, in which the server is aware of the request. In the following sequence, the urgent bit (e.g., bit 308) is not set during the illustrated negotiation:

In the illustrative sequence shown above, an initial TCP state of a first endpoint, e.g., a client, is closed, and an initial TCP state of a second endpoint, e.g., a server is listening for a transmission (e.g., at step (a)). The client sends request for redirection to the server in step (b), e.g., by encoding the request in a TCP packet sent to the server. The server responds in step (c) by sending a TCP packet in which an address of another server is encoded (e.g., with the address to the other server encoded in the sequence number and urgent pointer fields). The client acknowledges receipt of the new server address in step (d), e.g., by encoding the acknowledgement in the urgent pointer field. Thus, an ending TCP state of the client, in step (e), is closed, and an ending TCP state of the server is listening, e.g., for transmissions from other sources.

If the server is not aware of the client's request for redirection, the server will simply operate as normal over the original TCP connection. For example, the following sequence illustrates one embodiment of a request to negotiate a server redirection, initiated by the client, in which the server is not aware of the request. In the following sequence, the urgent bit (e.g., bit 308) is not set during the illustrated negotiation:

| TCP STATE | TCP FIELDS SET | TCP STATE |
|---|---|---|
| a) CLOSED | | LISTEN |
| b) SYN-SENT → | SEQ(X),URG(Z),CTL(SYN) → | SYN-RECV |
| | *Client requests server redirection* | |
| c) SYN-RECV ← | SEQ(Y),ACK(X+1),URG(Z'),CTL(SYN,ACK) | ← SYN-SENT |
| | *Server encodes redirection address using SEQ and URG fields* | |
| d) ACK-SENT → | SEQ(X+1),ACK(Y+1),URG(Z"),CTL(ACK) | → ACK-RECV |
| | *Client acknowledges redirection with urgent field* | |
| e) CLOSED | | LISTEN |

| TCP STATE | TCP FIELDS SET | TCP STATE |
|---|---|---|
| a) CLOSED | | LISTEN |
| b) SYN-SENT → | SEQ(X), URG(Z) CTL(SYN) → | SYN-RECV |
| | *Client requests server redirection* | |
| c) SYN-SENT ← | SEQ(Y),ACK(X+1),CTL(SYN,ACK) ← | SYN-RECV |
| | *Server is not capable of redirection* | |
| d) ACK-SENT → | SEQ(X+1),ACK(Y+1),CTL(ACK) → | ACK-RECV |
| | *Normal TCP connection maintained* | |
| e) ESTABLISHED | | ESTABLISHED |

In the illustrative sequence shown above, an initial TCP state of a first endpoint, e.g., a client, is closed, and an initial TCP state of a second endpoint, e.g., a server is listening for a transmission (e.g., at step (a)). The client sends request for redirection to the server in step (b), e.g., by encoding the request in a TCP packet sent to the server. The server is not aware of the client's request, and so a TCP packet sent by the server to the client in step (c) contains no response to the client's request. Thus, a normal TCP connection is maintained in step (d), and an ending TCP state of the client, in step (e), is closed, and ending TCP states of both the client and the server reflect the established TCP connection in step (e).

In one embodiment, if a client or server attempts to initiate a negotiation after a TCP connection has already been established, the initiating endpoint indicates the negotiation request by setting the urgent pointer field of the TCP header with a particular bit pattern. The initiating endpoint also stops sending normal data packets and waits for the other end of the TCP connection (e.g., the contacted endpoint) to indicate that it is aware of the negotiation, for example by sending a TCP packet with the urgent pointer field set with a particular bit pattern. Negotiation data is not treated as normal TCP data and is not delivered to an application connected to the client. Once the negotiation phase is completed and all out-of-band data has been sent, normal TCP functionality may continue, e.g., from the point where it was left before the negotiation.

Figure 4:
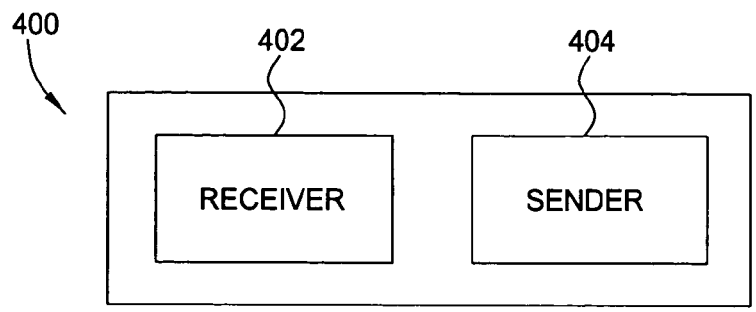
FIG. 4 is a schematic diagram illustrating one embodiment of a transport layer processing unit for enabling clients and servers to negotiate network characteristics according to the present invention.

FIG. 4 is a schematic diagram illustrating one embodiment of a transport layer processing unit 400 for enabling clients and servers to negotiate network characteristics according to the present invention. The transport layer processing unit 400 is a network interface adapted for incorporation into a TCP capable device and includes a TCP packet receiver 402 and a TCP packet sender 404. The TCP packet receiver 402 is adapted for scanning all packets received by the TCP capable device for the indication of negotiation data (e.g., as contained within a TCP header of an incoming packet). The TCP packet sender is adapted for encoding negotiation data into outgoing packets (e.g., by encoding the negotiation data into a packet's TCP header). Alternatively, the transport layer processing unit 400 may be enabled to ignore all negotiation requests. In another embodiment, a transport layer processing unit such as the unit 400 may be embodied in a software application.

Figure 5:
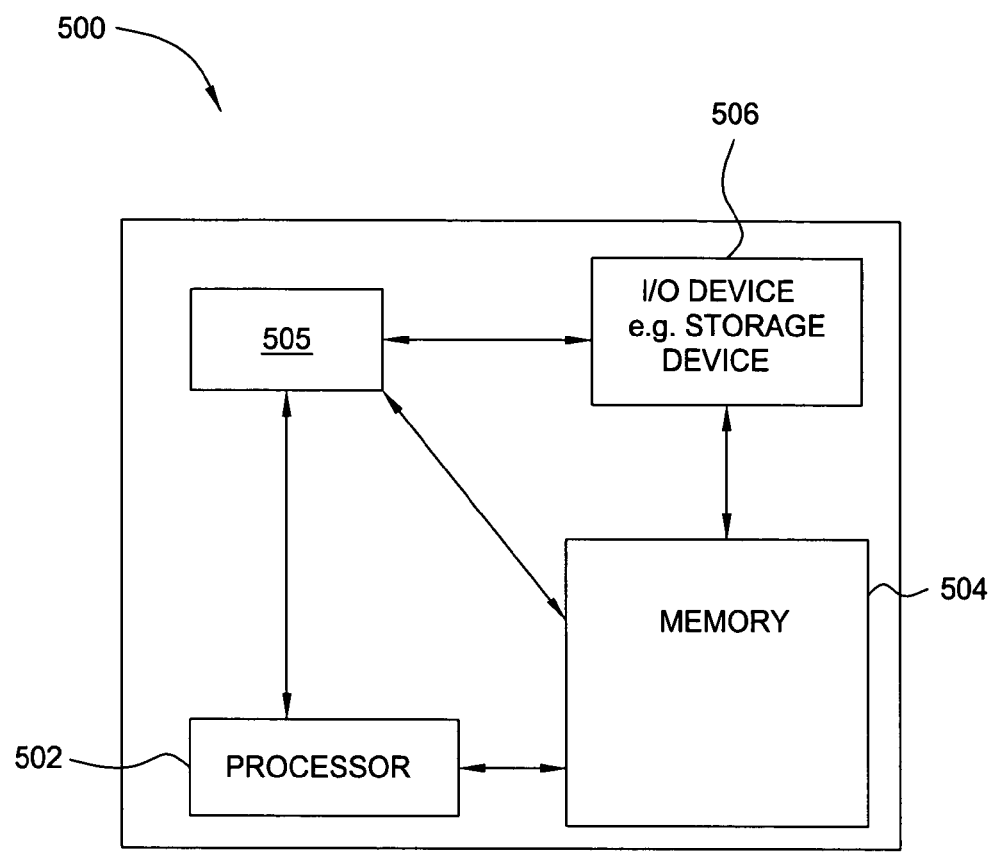
FIG. 5 is a high level block diagram of the present invention implemented using a general purpose computing device.

FIG. 5 is a high level block diagram of the present TCP negotiation system, implemented using a general purpose computing device 500. In one embodiment, a general purpose computing device 500 comprises a processor 502, a memory 504, a TCP negotiator or module 505 (e.g., configured similarly to the transport layer processing unit 400) and various input/output (I/O) devices 506 such as a display, a keyboard, a mouse, a modem, and the like. In one embodiment, at least one I/O device is a storage device (e.g., a disk drive, an optical disk drive, a floppy disk drive). It should be understood that the TCP negotiator 505 can be implemented as a physical device or subsystem that is coupled to a processor through a communication channel.

Alternatively, the TCP negotiator 505 can be represented by one or more software applications (or even a combination of software and hardware, e.g., using Application Specific Integrated Circuits (ASIC)), where the software is loaded from a storage medium (e.g., I/O devices Y06) and operated by the processor 502 in the memory 504 of the general purpose computing device 500. Thus, in one embodiment, the TCP negotiator 505 for allocating resources among entities described herein with reference to the preceding figures can be stored on a computer readable medium or carrier (e.g., RAM, magnetic or optical drive or diskette, and the like).

Thus, the present invention represents a significant advancement in the field of data transport over TCP connections. A method and apparatus are provided that enable transparent network characteristic negotiations between two endpoints on a TCP connection, thereby optimizing data transport over the network. Negotiations may be initiated by either endpoint on the connection, and may pertain to a network characteristic such as computer or network administration and management (e.g., TCP window size, server redirection and the like).

While foregoing is directed to the preferred embodiment of the present invention, other and further embodiments of the invention may be devised without departing from the basic scope thereof, and the scope thereof is determined by the claims that follow.

The invention claimed is:

1. A method for negotiating network characteristics between a first endpoint and a second endpoint on a transmission control protocol (TCP) connection, the method comprising the steps of:

transmitting at least one negotiation request from the first endpoint to the second endpoint, wherein the at least one negotiation request, and a response to the at least one negotiation request, are transmitted within TCP headers of data packets sent between the first endpoint and the second endpoint, wherein the step of transmitting the at least one negotiation request comprises:

encoding the at least one negotiation request within a sequence number field of a TCP header sent to the second endpoint;

setting a portion of an urgent pointer field of the TCP header to a bit pattern that indicates that the sequence number field and the urgent pointer field contain negotiation data; and wherein an urgent bit in the TCP header is not set;

responding to the at least one negotiation request, if the second endpoint is aware of the at least one negotiation request, wherein the step of responding to the at least one negotiation request comprises:

recognizing the bit pattern in the urgent pointer field, with the urgent bit not set; and executing at least one requested negotiation;

maintaining normal network operations, if the second endpoint is not aware of the negotiation request; and acknowledging the at least one negotiation request by modifying an urgent pointer field in a data packet sent from the second endpoint to the first endpoint, wherein the modifying comprises setting a portion of the urgent pointer field to a bit pattern that indicates that the at least one negotiation request will be fulfilled and wherein an urgent bit in the TCP header is not set.

2. The method of claim 1, wherein an awareness of the second endpoint of the at least one negotiation request indicates an ability of the second endpoint to negotiate.

3. The method of claim 1, wherein the first endpoint is a server, and the second endpoint is a client connected to the server.

4. The method of claim 1, wherein the first endpoint is a client, and the second endpoint is a server connected to the client.

5. The method of claim 1, wherein a network characteristic being negotiated is at least one computer or network administration and management characteristic.

6. The method of claim 5, wherein the at least one computer or network administration and management characteristic is one of: TCP window size, server redirection, server shutdown time, and server offline scheduling.

7. The method of claim 1, wherein the step of transmitting at least one negotiation request occurs during establishment of the TCP connection between the first endpoint and the second endpoint.

8. The method of claim 1, wherein the step of transmitting at least one negotiation request occurs after establishment of the TCP connection between the first endpoint and the second endpoint.

* * * * *